United States Patent [19]
Fattahi

[11] Patent Number: 4,892,113
[45] Date of Patent: Jan. 9, 1990

[54] MOISTURE MONITOR AND CONTROL SYSTEM

[75] Inventor: Farrokh Fattahi, Boulder, Colo.

[73] Assignee: Spectrum 2000, Inc., Boulder, Colo.

[21] Appl. No.: 5,149

[22] Filed: Jan. 20, 1987

Related U.S. Application Data

[63] Continuation-in-part of Ser. No. 825,254, Feb. 3, 1986, abandoned.

[51] Int. Cl.⁴ .............................................. F16K 17/36
[52] U.S. Cl. .............................. 137/78.3; 137/624.12; 239/64; 239/70; 251/129.05
[58] Field of Search ...................... 137/624.11, 624.12, 137/78.3; 239/64, 69, 70; 251/129.05

[56] References Cited

U.S. PATENT DOCUMENTS

| | | | |
|---|---|---|---|
| 3,724,485 | 4/1973 | Cox et al. | 251/129.05 |
| 3,777,976 | 12/1973 | Milovancevic | 137/78.3 |
| 3,874,407 | 4/1975 | Griswold | 251/129.05 |
| 3,991,375 | 11/1976 | Riggs et al. | 239/64 |
| 4,165,532 | 8/1979 | Kendall et al. | 239/70 |
| 4,205,956 | 6/1980 | Stedman | 250/361 C |
| 4,209,131 | 6/1980 | Barash et al. | 239/69 |
| 4,232,707 | 11/1980 | Sturman et al. | 239/20 |
| 4,545,396 | 10/1985 | Miller et al. | 137/78.3 |
| 4,546,795 | 10/1985 | Okamoto et al. | 251/129.05 |
| 4,719,910 | 1/1968 | Jensen | 128/204.21 |

Primary Examiner—A. Michael Chambers
Attorney, Agent, or Firm—Dean P. Edmundson

[57] ABSTRACT

A system is described for monitoring moisture level in soil and controlling the application of water to the soil or other growing media. The system includes at least one sensing unit which is disposed in the soil and is adapted to periodically monitor moisture content in the soil. The sensing unit is powered by low voltage, low current, alternating current having a frequency in the range of 1.0 to 10 KHz and utilizes a square wave with fifty percent duty cycle. A control means is electrically connected to the sensing unit and is adapted to (a) compare the moisture content in the soil to a preset moisture requirement, and (b) control the application of water to the soil.

18 Claims, 7 Drawing Sheets

MOISTURE MONITOR AND CONTROL SYSTEM

CROSS-REFERENCE TO RELATED APPLICATION

This application is a continuation-in-part of my co-pending application Ser. No. 825,254, filed Feb. 3, 1986 now abandoned.

FIELD OF THE INVENTION

This invention relates to techniques for controlling irrigation systems. More particularly, this invention relates to electronic systems for controlling the operation of irrigation systems. Even more particularly, this invention relates to techniques for monitoring moisture levels in the soil (or other media) and controlling irrigation systems in accordance with moisture requirements of the soil.

BACKGROUND OF THE INVENTION

Water usage continues to increase in seemingly all sectors of society, including industrial, commercial, agricultural and consumer areas. This has led to concern over water shortages even at the national level. Thus, it is undisputed that water usage must become more efficient to avoid shortages and conflicts over water rights.

Although there have been proposed various types of consumer irrigation systems which include a clock or some type of timing device which automatically starts and stops the flow of water in the irrigation system (e.g., for use in watering a lawn), such irrigation systems operate only in accordance with the manner in which they have been pre-set. That is, the timing device is programmed to start and then stop the flow of water at very precise, predetermined times. The need for water, however, varies from time to time and is to that extent independent of the operation of the irrigation system. Thus, at best, the effectiveness of such irrigation systems is only as good as the ability of the owner to predict the precise need for water in the soil.

One type of device which has been used previously to measure need for added moisture in soil is known as a tensiometer. Such a device includes a tube filled with water and inserted into the ground. At the top of the tube there is a vacuum gauge. As water from the tube diffuses into the soil a vacuum is created at the top of the tube. The vacuum gauge can be adapted to trip a switch, for example, to activate an irrigation system.

Another type of device used to determine moisture content in soil includes a gypsum block having two electrodes inside of it and wires attached to the electrodes. The device is buried in the ground with the wires being accessible at the top of the ground (e.g., in a box). A portable ohm meter (powered by a DC battery) may be temporarily connected to the wires in order to measure the resistivity of the soil. The resistivity measurement obtained is compared to a chart or guide in order to determine how much water should be applied to the soil.

SUMMARY OF THE PRESENT INVENTION

In accordance with the present invention there is provided a system for monitoring the moisture level in soil (e.g., a garden, lawn, etc.) and controlling application of water to the soil. As used herein, the term "soil" is intended to include, without limitation, any type of media which may be used for growing vegetation, such as ordinary soil, sand, gravel, rockwool, consolidated aggregate, foamed materials (e.g., polyurethane foam), or other such materials or combinations thereof.

The system of the invention includes:
 (a) at least one sensing unit which is disposed in the soil and which is adapted to periodically monitor the moisture content of the soil; and
 (b) control means which is electrically connected to the sensing unit(s) and which is adapted to (i) compare the moisture content in the soil to a preset moisture requirement, and (ii) control the application of water to the soil.

The sensing unit is powered by low voltage, low current, alternating current having a frequency in the range of about 1.0 KHz to 10 KHz and utilizes a square wave with fifty percent duty cycle.

The system of this invention may be used in conjunction with either a drip or trickle irrigation system or a sprinkler irrigation system. The system may be adapted to existing irrigation systems controlled by a timer or it may be packaged with its own timer.

The system of this invention is adapted to accurately monitor the moisture content in the soil on a periodic basis (e.g., every few minutes) and control the proper application of moisture to the soil. Accordingly, no water is applied to the soil unless its moisture content is less than a preset moisture requirement. This avoids unnecessary watering of soil which already has sufficient moisture.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
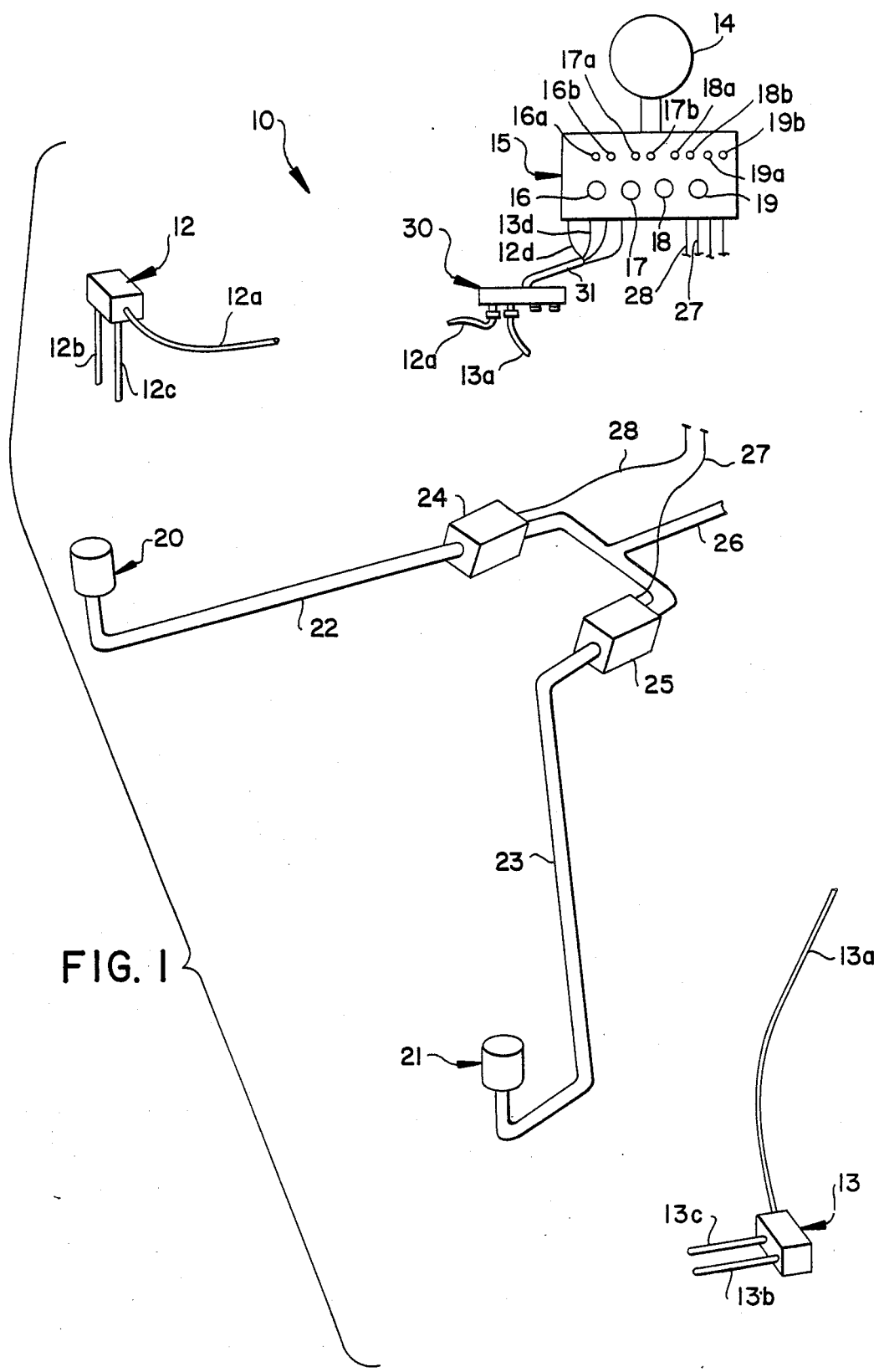
FIG. 1 is a perspective view illustrating one embodiment of monitoring and control system of the invention.

In FIG. 1 there is shown one embodiment of monitoring and control system 10 of the invention. In this view there are shown two sensing units 12 and 13 which typically are located or disposed below ground in the areas of the soil where it is desired to measure the level of moisture content in the soil. For example, such sensing units may be disposed at various locations in a lawn area of a home, or commercial or industrial place of business, or golf course, or park area, etc. As explained in more detail hereinafter, there may be any desired number of such sensing units used in the system of the invention. The probes extending outwardly from each sensing unit may project downwardly in a vertical manner (as illustrated by probes 12b and 12c in FIG. 1), or they may extend horizontally (as illustrated by probes 13b and 13c), or they may extend downwardly at an angle.

The sensing units 12 and 13 are electrically connected to control means 15 by coaxial cables or other cables containing at least one set of twisted pair wires 12a and 13a, respectively. Cables are preferred over wires for this purpose because of their strength, durability, ease of installation, and weather-resistance.

The irrigation system shown in FIG. 1 illustrates sprinkler heads 20 and 21 on water lines 22 and 23. The main water feed line is designated 26 and it provides water to lines 22 and 23 through valve members 24 and 25, respectively. Each valve member is movable between an open position and a closed position. When the valve is in open position water flows through the line to the sprinkler head on that line.

Each valve member is electrically controllable. Thus, electrical line 28 controls the operation of valve 24 and electrical line 27 controls the operation of valve 25. That is, the valve is controllable to be opened or closed electrically.

Each sensing unit is adapted to monitor the moisture content in the soil via the probes which extend into the soil. For sensing unit 12 the probes are referred to as 12b and 12c, while for sensing unit 13 the probes are referred to as 13b and 13c. The sensing unit monitors the moisture content of the soil periodically, as described herein.

The moisture content in the soil measured by the sensing unit is reported to the control means 15 via the cable. Preferably one end of each cable (such as cables 12a and 13a) is connected to an interface unit 30 which is a housing or enclosure which accepts a number of cable inputs and converts them to a multi-conductor cable 31. The multi-conductor cable includes separate wires 12d, 13d, etc. which connected to one conductor of a cable 12a, 13a, respectively within the enclosure. There is also a common return wire. One embodiment of this is illustrated in more detail in the cut-away view of FIG. 6 where a coaxial cable is used. The purpose of the interface unit is to avoid the need to connect separate coaxial cables directly to the control means 15. If the length of any cable exceeds about 50 feet, it is preferred not to use a coaxial cable. Because the capacitance of a coaxial cable increases with length, it is preferred to use a cable with twisted pair wiring where the length of the cable is about 50 feet or more.

At the control means the moisture content is compared to a preset moisture requirement which may be designated for each water station by means of separate dials 16, 17, 18 and 19. If the preset moisture requirement exceeds the moisture content reported by a particular sensing unit, then the control means 15 is adapted to cause a corresponding valve member in a water line to open and allow water to flow through such line, in a manner described in detail hereinafter.

Although FIG. 1 shows only two sensing units and two valve members, it is to be understood that one system may include any number of sensing units, valve members, and sprinkler heads, as well as moisture dials on the control means 15, as desired. For example, there may be several sensors which together provide a moisture content value which is an average for a given area of soil to be irrigated As another example, one sensing unit may be responsible for providing a moisture content value which is used by the control means to control more than one valve.

Although FIG. 1 illustrates a four zone controller, the number of controllers in each system may vary and is limited only by the number of zones which a person desires to control in a given system.

The system may also include light-emitting diodes (LED) 16a and b, 17a and 5, 18a and b, and 19a and b at the control unit. For example, for each zone there may be a red LED (e.g., 16a) and a green LED (e.g., 16b). When a sensing unit (e.g., unit 12) detects a soil moisture value which is less than the preset moisture requirement for that zone (i.e., as specified by the moisture dial 16), the red LED 6a is activated. When the timer instructs the control means to begin a new watering cycle, and valve 24 is opened to permit water to flow to sprinkler 20, the green LED 16b is activated, indicating that valve 24 is open. LED 16b remains activated so long as valve 24 is in the open position. If such water is applied to the soil to bring the moisture content up to or exceeding the preset moisture requirement, then red LED 16a is deactivated at the completion of the watering cycle.

The system of this invention may be used in conjunction with either a sprinkler irrigation system or a drip (i.e., trickle) irrigation system, as desired. The control means may be relied upon to actuate a valve in a water line or it may be relied upon to activate a pump.

The system of the invention may be used in a conventional irrigation system, for example, by operably connecting it between the existing timer 14 and the valve members 24 and 25. Alternatively, the system of the invention may include its own timer.

Figure 2:
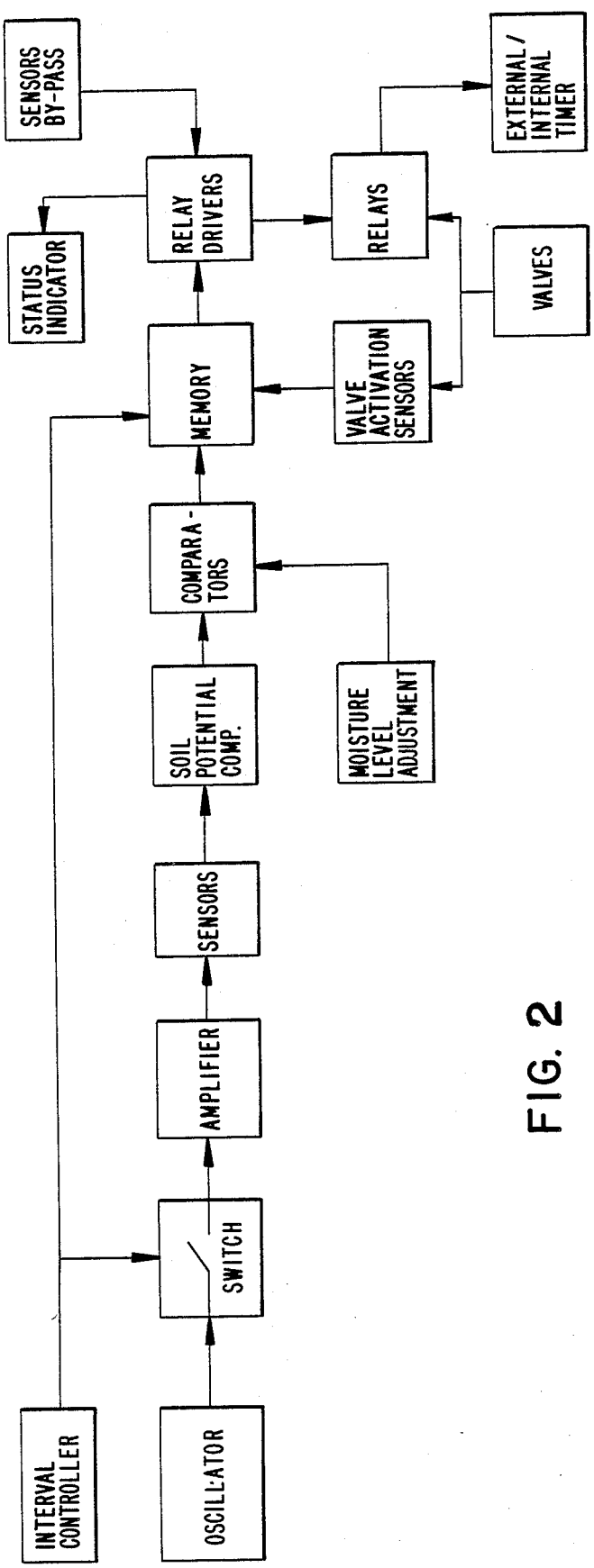
FIG. 2 is a schematic diagram of one embodiment of monitoring and control system of this invention.

FIG. 2 is a block diagram illustrating one embodiment of monitoring and control system of the invention. An oscillator generates the desired A.C. signal which is applied to the amplifier at periodic intervals as determined by the internal control device (i.e., a clock). The A.C. signal is amplified and then sent to the sensing units. The level of the signals received from each sensing unit is related to the moisture content of the soil and is compared with the preset moisture requirement for the particular zone in question. The preset moisture requirement for each zone is determined by the moisture level adjusting means (e.g., a dial on the control unit). The results from the comparators then go to the memory unit. The memory contents are updated at pre-set intervals as determined by the internal control device to reflect the latest soil moisture content information received from the sensing units.

The internal control device is pre-set in a manner such that the A.C. signal is amplified and sent to the sensing units periodically instead of continuously. For example, the A.C. signal is sent to the sensing units once each 15 minutes, or 30 minutes, or each two hours, etc., depending upon how often it is desired to monitor the soil moisture. As an example, once each 15 minutes the A.C. signal is sent to the sensing units for a period of about 1 to 60 seconds for monitoring the soil moisture.

The information at each memory location is monitored by the valve control drivers which also drive the status indicators (i.e., the light-emitting diodes). The information from the sensing units may be over-ridden or by-passed by engagement of the sensors by-pass switch. This causes total by-pass of the circuitry.

The valve activation devices may comprise either electromechanical or electronic power control devices (e.g., electromechanical relays, solid state relays, triacs, etc.). In the block diagram of FIG. 2 the valve actuation devices are shown as relays, and the valve control drivers are referred to as relay drivers.

Upon activation of a valve in a water line as a result of timer operation and a requirement for more moisture in the soil (as indicated by the appropriate sensor circuitry), a "store" command is initiated by the valve activation sensors. This "store" command, once received by the memory unit, keeps the contents of the respective memory location from changing during watering and thus allows completion of a watering cycle once it has begun. Upon completion of a watering cycle (a predetermined length of time for which it is desired to have water applied), the system is reset and the contents of the memory are updated again as the sensing units are scanned at predetermined intervals until the next watering cycle begins (e.g., 2 or 3 times per day), as governed by the external or internal timer.

The soil potential compensation network comprises circuitry which compensates for the random D.C. potential of the soil. The sensors by-pass switch enables one to by-pass the moisture measuring and control device unit, if desired.

The internal controller is an internal timing device which determines (a) how often the A.C. signal is sent to the sensing units, and (b) the length of time over which each signal is sent to the sensing units. For example, in a typical situation the signal may be sent to the sensing units each 15 minutes for a duration of a few seconds (e.g., 1 to 60 seconds). This would mean that the test interval would be 15 minutes, and the duration or period of the test would be a few seconds. The test interval normally is a period of time in the range of about 15 minutes to 2 hours.

It has been found that periodic sensing of the moisture content of the soil is preferable to continuous monitoring. With continuous power to the sensing probes in the soil the apparent soil resistivity may differ from the actual soil resistivity due to electrolysis. It has also been found that continuous monitoring of moisture content is not required in typical situations.

Figure 3A:
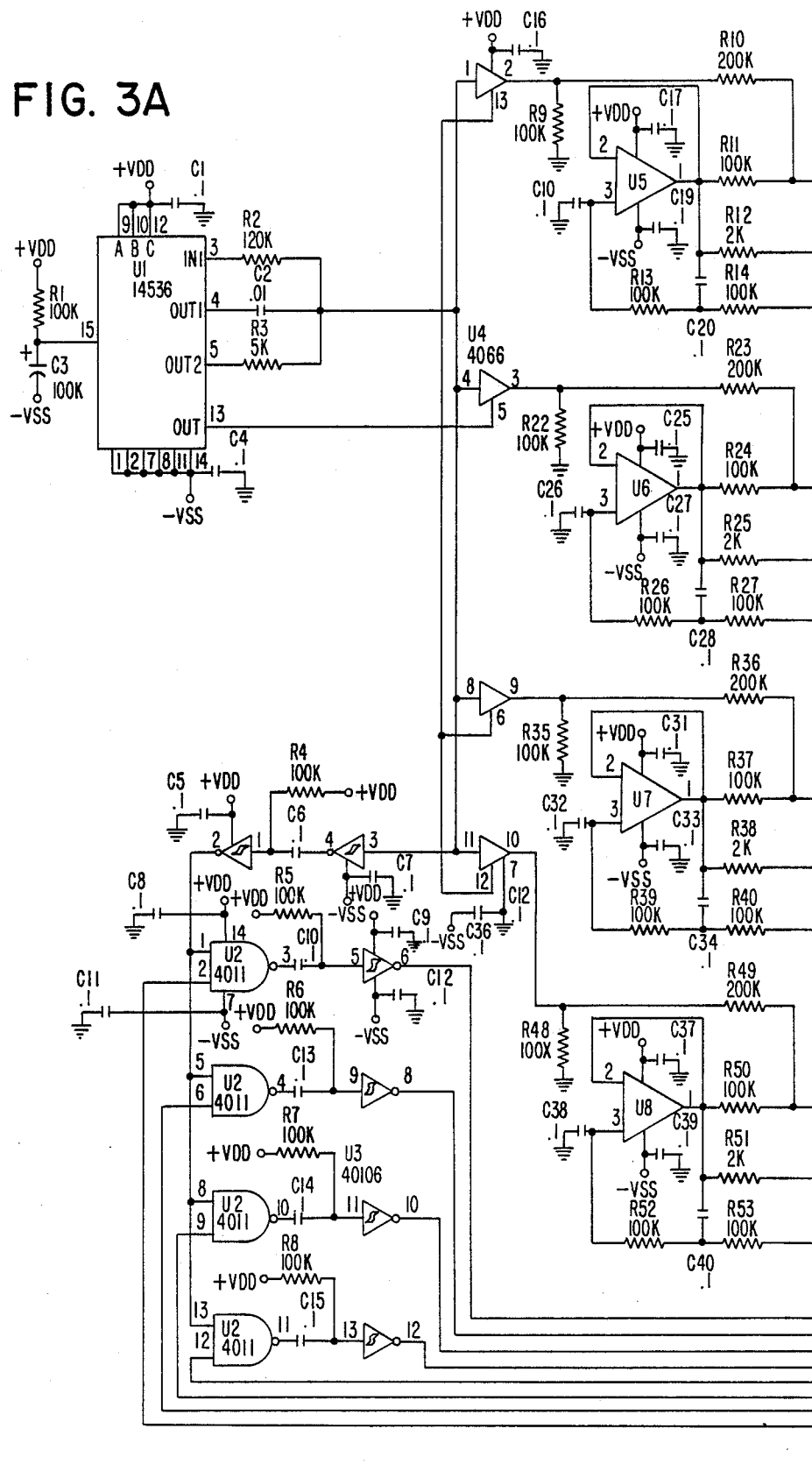
FIGS. 3A-3C are circuit diagrams of a preferred embodiment of monitoring and control system of this invention.
Figure 3B:
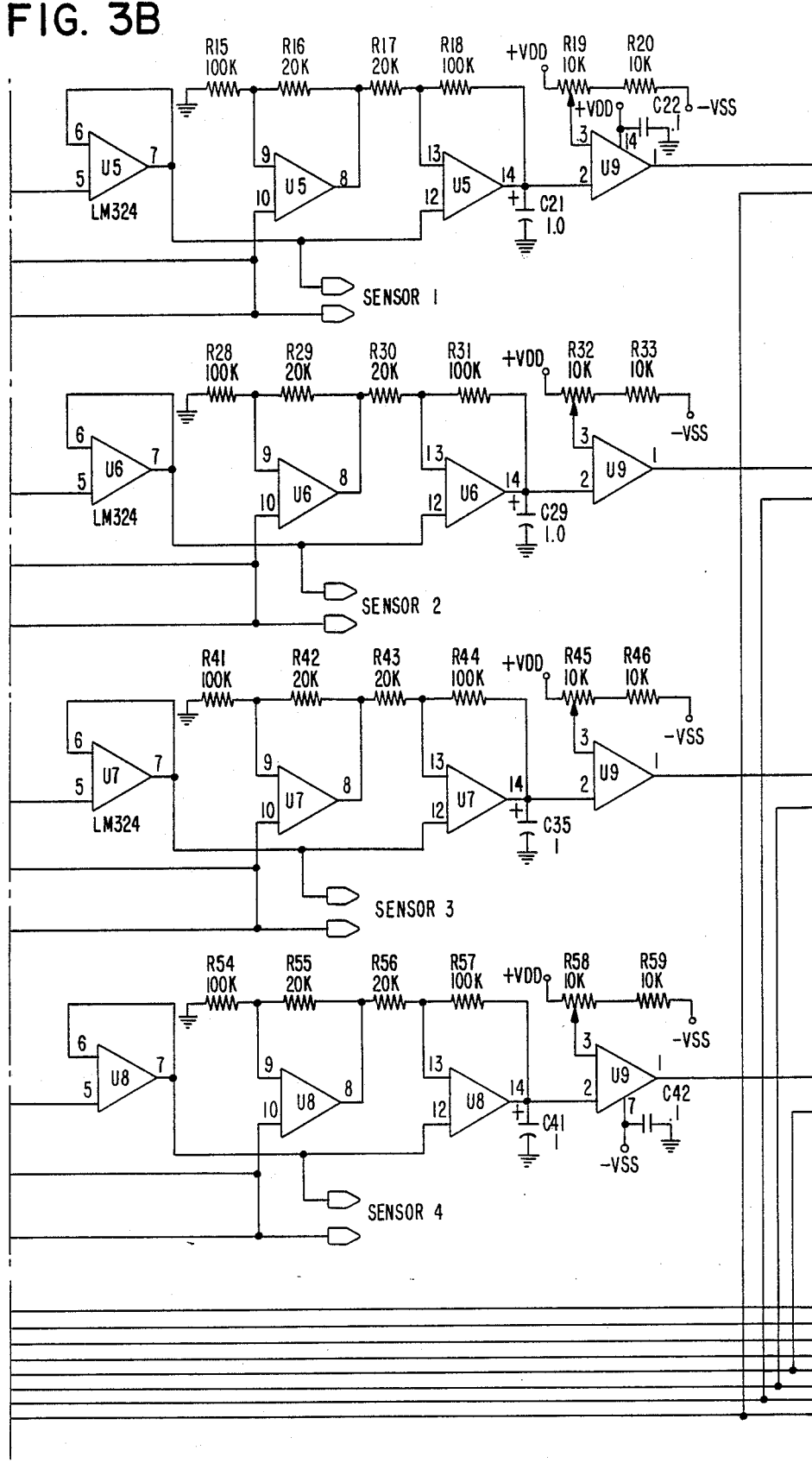
Figure 3C:
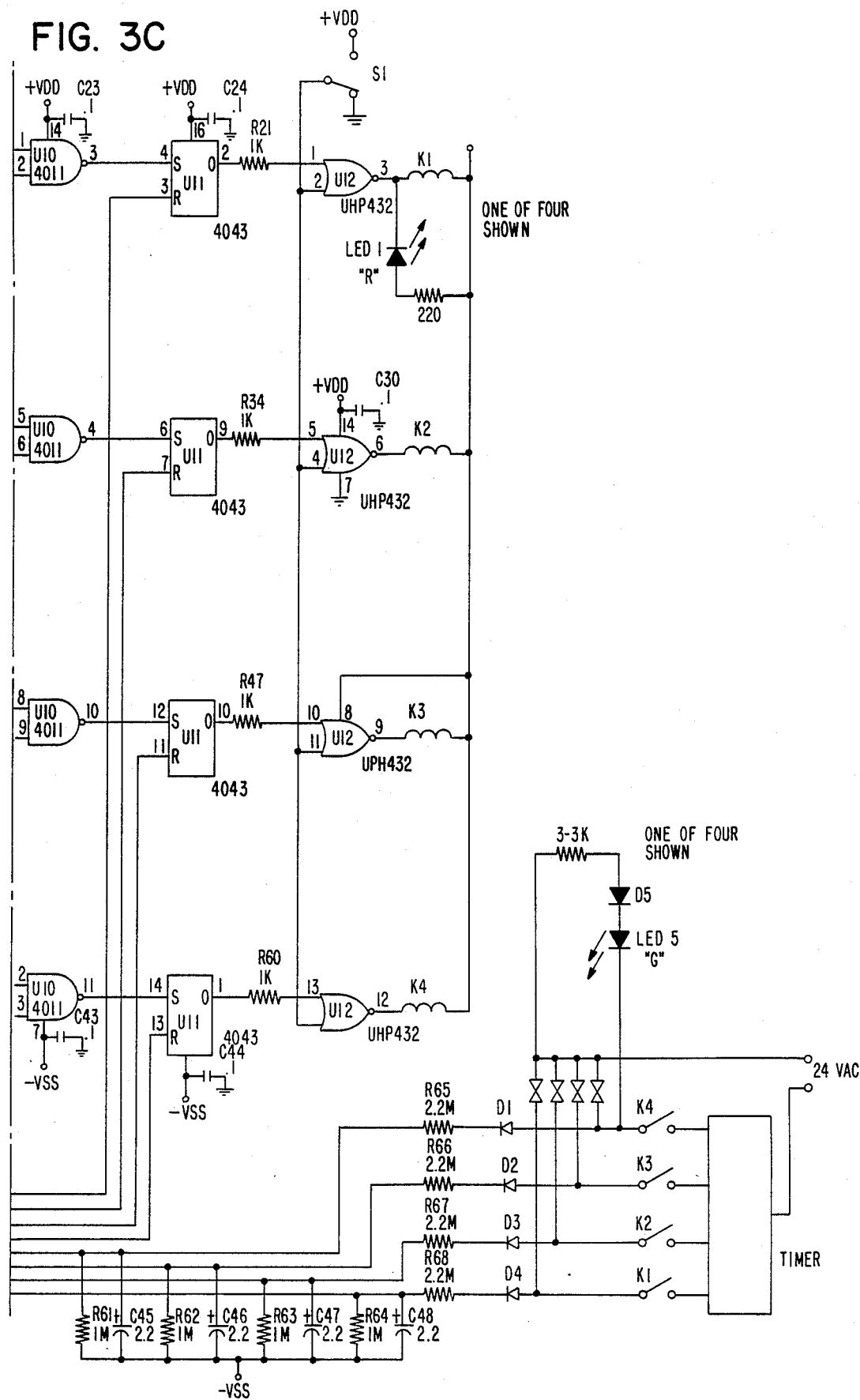

FIG. 3 is a circuit diagram of the electronics used in the embodiment of monitoring and control system shown in FIG. 2. The oscillator circuitry comprises half of the integrated circuit U1 and generates the required A.C. signal needed to measure the soil moisture. This A.C. signal is gated to the rest of circuitry, through U4, at predetermined intervals controlled by the second half of U1. Integrated circuits U5 through U8 each comprise four independent operational amplifiers which are used to amplify the A.C. signal and supply it to the sensors (i.e., sensing units); receive the attenuated A.C. signal back from the sensors; compensate for the random D.C. potential of the soil; and then amplify the processed signal for comparison with the pre-set moisture level by U9.

Integrated circuit U11 is the temporary storage medium which stores and/or updates the water requirement information for each zone at the end of each testing interval.

Integrated circuits U2, U3, U10 and their associated circuitry control the timing functions to assure that updated information is stored in memory at the completion of each test interval, and that the latest information which is stored before the start of the watering cycle is maintained in order to allow an uninterrupted watering period as controlled by the external or internal timer.

The relay driver integrated circuit U12 activates relays K1 through K4, when the measured moisture level in the soil falls below the pre-set value, thereby allowing activation of watering valves under the control of the external or internal timer. Switch S1 allows total by-pass of the moisture measuring and control device unit if desired.

The status of the memory is indicated by red Light Emiting Diodes (LEDs), LED 1 through LED 4. The valves activity status is indicated by green LED, LED 5 through LED 8.

Upon completion of a watering cycle the system is reset and the contents of the memory continue to be updated again as the sensing units are periodically scanned until the next watering cycle begins.

Figure 4:
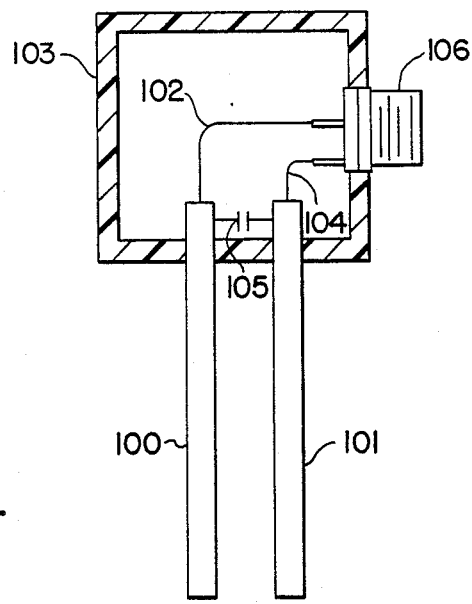
FIG. 4 is a cut-away view of one embodiment of moisture-sensing device useful in the present invention.
Figure 5:
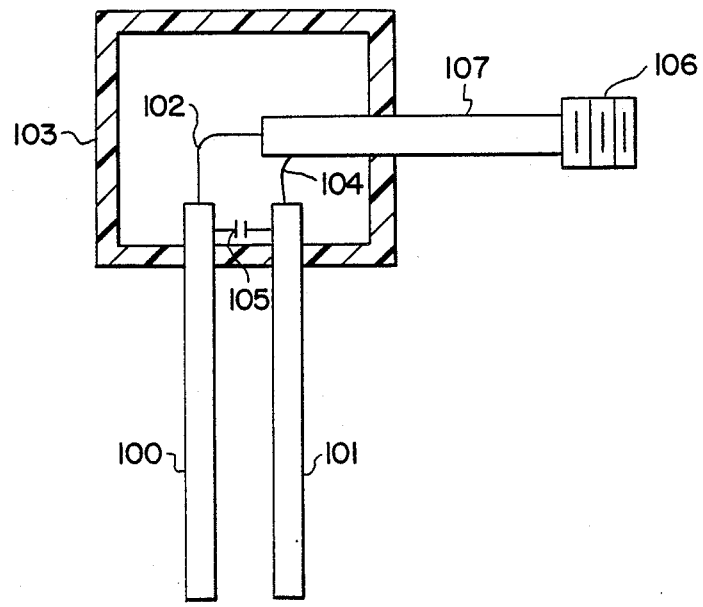
FIG. 5 is a cut-away view of another embodiment of moisture-sensing device which is useful in the present invention.

FIGS. 4 and 5 are cut-away views of two embodiments of moisture sensing devices which are useful in this invention. Each moisture sensing device includes two elongated, spaced-apart, electrically conductive probes 100 and 101 carried or suspended from a non-conductive box or housing 103. A conductive wire 102 is attached to the probe 100, and conductive wire 104 is attached to the probe 101. A surge suppressor 105 is connected between the upper ends of the two probes, as shown.

In FIG. 4 the wires 102 and 104 are shown connected to an F type coaxial connector 106. Then a conventional coaxial cable may be operably connected at one end to connector 106 and lead to the interface unit for eventual connection to the control unit for the system. As previously stated, if the length of the cable exceeds about 50 feet it is preferred not to use a coaxial cable. In such cases it is preferred to use a cable with twisted pair wiring.

In FIG. 5 the wires 102 and 104 are the center conductor and shield of a coaxial cable 107 within the housing or enclosure 103, and a connector 106 is outside the enclosure (e.g., approximately 4 to 6 inches from the enclosure).

The probes 100 and 101 are preferably made of stainless steel so that they do not corrode in the soil or other growing media. Preferably the length of the probes is in the range of about 4 to 10 inches, with a length of 6 inches being preferred. The diameter of the probes may vary, although a diameter of about ⅛ inch is preferred.

One of the unique features of the system of the invention is the operation of the moisture sensing units. The sensing units operate on a low voltage (e.g., less than 24 volts, and preferably about 5 to 15 volts), alternating current high frequency (e.g., about 1.0 to 10 KHz), low current (e.g., less than about 50 milliamps, and preferably about 5 to 10 milliamps), and a square wave with fifty percent duty cycle.

The system may include its own timer, if desired, or it may be connected into an existing sprinkler irrigation system which has its own timer. Thus, the timer may be either external or internal.

In another variation, the system of the invention does not require any timer when used in conjunction with a drip or trickle irrigation system. In such a system the control means activates a valve or pump automatically in order to start water flow through one or more water lines when the sensing unit determines that the moisture content in the soil is below the preset moisture requirement. Then when the moisture content in the soil reaches the preset requirement, the control means closes the valve in the water line.

Figure 6:
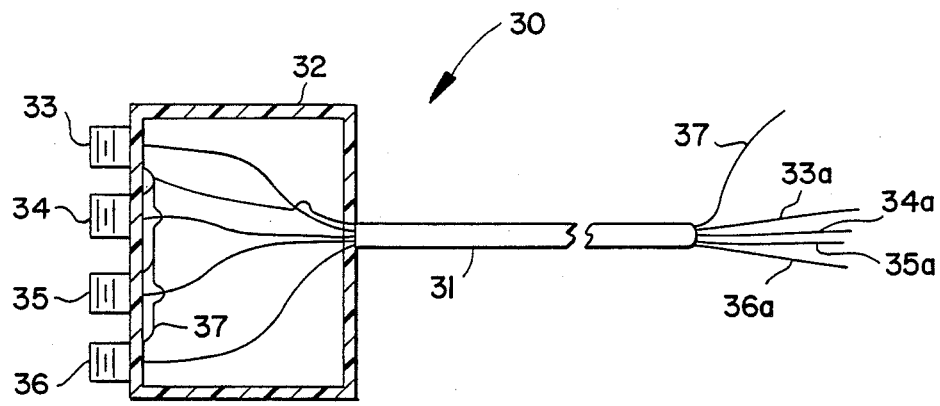
FIG. 6 illustrates one type of interface unit which is useful in the system of the invention.

In FIG. 6 there is shown a cut-away view of one embodiment of interface unit 30 comprising housing or enclosure 32. On one face there are a plurality of conventional F-type coaxial connectors 33, 34, 35 and 36 attached. Wires 33a, 34a, 35a and 36a are adapted to be connected to the center conductors of coaxial cables which can be attached to connectors 33, 34, 35 and 36. Wire 37 is attached to the shield contact of each coaxial connector and is a common return wire. All conductors exiting the housing 32 may be contained within a cable 31, as shown. The length of cable 31 may vary, for example, from about 12 to 36 inches. There may be any desired member of connectors attached to the housing.

Figure 7:
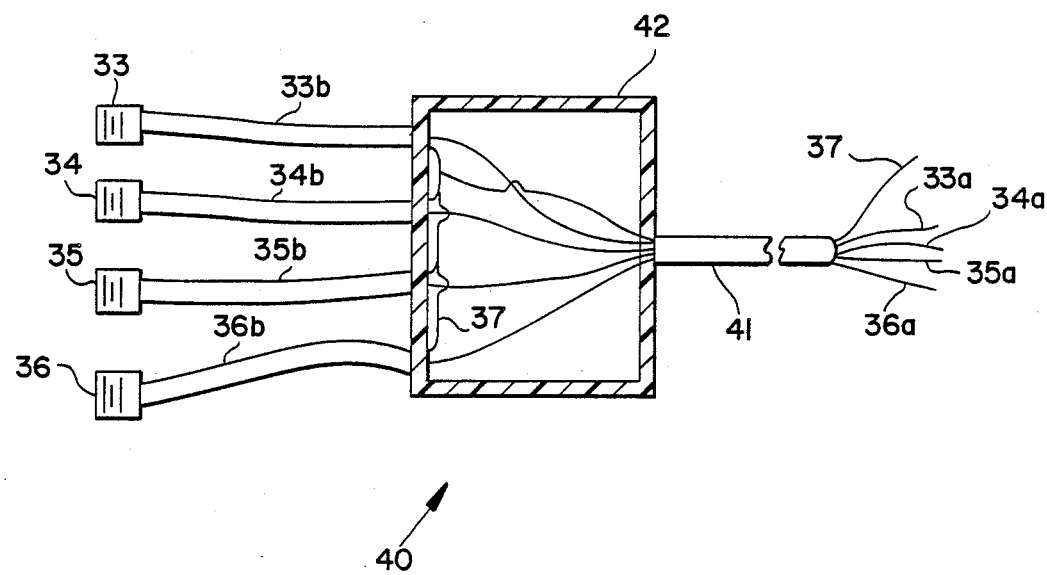
FIG. 7 illustrates another type of interface unit which is useful in the system of this invention.

In FIG. 7 there is shown a cut-away view of another embodiment of interface unit 40 comprising housing 42. To one face of the housing there are attached a plurality of coaxial cable leads 33b, 34b, 35b and 36b. The outer end of each cable includes an F-type connector. The length of each cable lead is typically in the range of about 4 to 6 inches. The length of multi-conductor cable 31 exiting the housing is normally in the range of about 12 to 36 inches.

Other variations are also possible without departing from the scope of the present invention.

I claim:

1. A system for monitoring moisture level in soil and controlling application of water to said soil, said system comprising:
   (a) a plurality of sensing units disposed in said soil, each said sensing unit being adapted to monitor moisture content in said soil; wherein each said sensing unit is powered by low voltage, low current, alternating current having a frequency in the range of about 1.8 to 10 KHz and utilizes a square wave with fifty percent duty cycle; and
   (b) control means which is electrically connected to each said sensing unit, wherein said control means is adapted to (i) compare said moisture content in said soil to a preset moisture requirement, and (ii) control the application of water to said soil; wherein said sensing units are periodically simultaneously activated to detect moisture content in said soil.

2. A system in accordance with claim 1, wherein said control means is adapted to actuate a valve in a water line.

3. A system in accordance with claim 1, wherein said control means is adapted to actuate a pump.

4. A system in accordance with claim 1, wherein each said sensing unit is powered by alternating current in the range of about 5 to 15 volts.

5. An irrigation system comprising
   (a) a source of water;
   (b) means for applying said water to soil;
   (c) a plurality of sensing units disposed in said soil, each said sensing unit being adapted to monitor moisture content in said soil; wherein each said sensing unit is powered by low voltage, low current, alternating current having a frequency in the range of about 1.8 to 10 KHz and utilizes a square wave with fifty percent duty cycle; and
   (d) control means which is electrically connected to each said sensing unit, wherein said control means is adapted to (i) compare said moisture content in said soil to a preset moisture requirement, and (ii) control said means for applying water to said soil; wherein said sensing units are periodically simultaneously activated to detect moisture content in said soil.

6. An irrigation system in accordance with claim 5, wherein said control means is adapted to apply water to said soil when said preset moisture requirement exceeds said moisture content in said soil.

7. An irrigation system in accordance with claim 5, wherein said source of water is a pressurized water line which includes at least one valve, wherein said valve is movable between a closed position and an open position which enables said water to flow through said line.

8. An irrigation system in accordance with claim 7, wherein said control means is adapted to move said valve to said open position when said preset moisture requirement exceeds said moisture content in said soil.

9. An irrigation system in accordance with claim 7, wherein said control means is adapted to move said valve to said closed position when said moisture content in said soil exceeds said preset moisture requirement.

10. An irrigation system in accordance with claim 6, wherein said means for applying water to said soil comprises a drip irrigation system.

11. An irrigation system in accordance with claim 6, wherein said means for applying water to said soil comprises a sprinkler system.

12. An irrigation system in accordance with claim 5, further comprising a timing device operably connected to said control means in a manner such that said control means periodically compares said moisture content in said soil with said preset moisture requirement.

13. An irrigation system in accordance with claim 7, wherein there are a plurality of said sensing units, each of which is operably connected to a said valve; wherein said control means includes a comparator which is adapted to compare each said moisture requirement and generate a signal when said preset moisture requirement exceeds said moisture content; wherein said control means further includes a memory unit capable of storing each said signal; and wherein said control means is adapted to periodically access said memory unit and actuate a said valve in response to a said signal.

14. An irrigation system in accordance with claim 13, wherein said means for applying water to said soil comprises a drip irrigation system.

15. An irrigation system in accordance with claim 13, wherein said means for applying water to said soil comprises a sprinkler system.

16. An irrigation system in accordance with claim 5, wherein each said sensing unit is electrically connected to said control means through a coaxial cable and an interface unit comprising an enclosure and an adaptor means for connecting the coaxial cable to a multi-conductor cable.

17. A moisture sensing device comprising (a) a pair of spaced-apart, elongated probes, said probes being electrically conductive, and (b) an electrical source means operably connected to said probes, said electrical source means having a frequency in the range of about 1.0 to 10 KHz, a voltage in the range of about 1 to 24 volts, a current below about 50 milliamps, and having a square wave pattern with fifty percent duty cycle.

18. A system for monitoring moisture level in soil and controlling application of water to said soil in accordance with claim 1, wherein said system includes an internal control device which is adapted to control the length of the interval between the times when said sensing units are adapted to monitor said moisture content of said soil.

* * * * *